United States Patent
Holzapfel et al.

(10) Patent No.: US 6,794,637 B1
(45) Date of Patent: Sep. 21, 2004

(54) OPTICAL DEVICE FOR MEASURING POSITION

(75) Inventors: Wolfgang Holzapfel, Obing (DE); Elmar Mayer, Nussdorf (DE)

(73) Assignee: Dr. Johannas Heidenhain GmbH, Traunreut (DE)

( * ) Notice: Subject to any disclaimer, the term of this patent is extended or adjusted under 35 U.S.C. 154(b) by 0 days.

(21) Appl. No.: 09/937,757
(22) PCT Filed: Apr. 15, 2000
(86) PCT No.: PCT/EP00/03441
§ 371 (c)(1), (2), (4) Date: Jan. 25, 2002
(87) PCT Pub. No.: WO00/65310
PCT Pub. Date: Nov. 2, 2000

(30) Foreign Application Priority Data

Apr. 22, 1999 (DE) .................................. 199 18 101

(51) Int. Cl.$^7$ ................................................ G01D 5/34
(52) U.S. Cl. ........................... 250/231.13; 250/231.16; 341/13
(58) Field of Search .................... 250/231, 231.13, 250/231.16, 231.14; 341/11, 13; 356/616, 617

(56) References Cited

U.S. PATENT DOCUMENTS

| 3,812,352 A | 5/1974 | MacGovern |
| 4,051,367 A | 9/1977 | Sayce et al. |
| 4,912,322 A | 3/1990 | Ichikawa |

(List continued on next page.)

FOREIGN PATENT DOCUMENTS

| DE | 26 53 545 | 5/1978 |
| DE | 27 14 324 | 10/1978 |
| DE | 37 27 188 | 4/1988 |

(List continued on next page.)

OTHER PUBLICATIONS

Pettigrew, R.M., "Anaylsis of Grating Imaging and Its Application to Displacement Metrology," SPIE vol. 136, 1$^{st}$ European Congress on Optics Applied to Metrology, 1977, pp. 325–333.

Pending Patent Application Assigned to Dr. Johannes Heidenhain GmbH: Ser. No.: 09/496,984, Filing Date: Feb. 02, 2000, Inventor: Hermann et al.

Primary Examiner—Christopher W. Fulton
Assistant Examiner—Yaritza Guadalupe
(74) Attorney, Agent, or Firm—Brinks Hofer Gilson & Lione

(57) ABSTRACT

An optical position measuring device that includes a measuring graduation and a scanning unit, which moves relative to the measuring graduation along a measuring direction. The scanning unit includes a light source, a transmitting graduation with a graduation period $P_{AT}$, on which a periodic strip pattern with a strip pattern period $P_{SM}$ results in case of a relative movement between the scanning unit and the measuring graduation. A detector arrangement arranged at a distance $D_{DET}$ from the scanning graduation with a plurality of blocks of individual detector elements, wherein the plurality of blocks are arranged periodically with a detector period $P_{DET}$ in the measuring direction. The transmitting graduation is at the distance u from the measuring graduation, the scanning graduation is at a distance v from the measuring graduation, and the detector period $P_{DET}$ has been selected in accordance with the equation $$P_{DET} = m*1*P_v,$$

wherein $$m = (1 + D_{DET}/(u+v+D_{LQ}))$$

and $$1 = 1, 2, 3, \ldots$$

and $$1/P_v = |1/P_{SM} - 1/P_{AT}|.$$

7 Claims, 4 Drawing Sheets

U.S. PATENT DOCUMENTS

| | | | |
|---|---|---|---|
| 5,067,816 A | 11/1991 | Ichikawa | |
| 5,264,915 A | 11/1993 | Huber et al. | |
| 5,386,642 A | 2/1995 | Spies et al. | |
| 5,774,219 A | 6/1998 | Matsuura | |
| 5,886,352 A | 3/1999 | Wright et al. | |
| 6,429,940 B1 * | 8/2002 | Willhelm | 250/237 G |
| 6,452,159 B2 * | 9/2002 | Holzapfel et al. | 250/231.13 |
| 6,472,658 B2 * | 10/2002 | Mayer et al. | 250/237 G |
| 2002/0148955 A1 * | 10/2002 | Hill | 250/201.3 |
| 2003/0010941 A1 * | 1/2003 | Spolaczyk et al. | 250/231.13 |

FOREIGN PATENT DOCUMENTS

| | | |
|---|---|---|
| DE | 197 01 941 | 7/1997 |
| DE | 39 04 898 | 11/1997 |
| WO | WO 97/16704 | 5/1997 |

* cited by examiner

OPTICAL DEVICE FOR MEASURING POSITION

Applicants claim, under 35 U.S.C. §120, the benefit of priority of the filing date of Apr. 15, 2000 of a Patent Cooperation Treaty patent application, copy attached, Serial Number PCT/EP00/03441, filed on the aforementioned date, the entire contents of which are incorporated herein by reference.

Applicants claim, under 35 U.S.C. §119, the benefit of priority of the filing date of Apr. 22, 1999 of a German patent application, copy attached, Serial Number 199 18 101.2, filed on the aforementioned date, the entire contents of which are incorporated herein by reference.

BACKGROUND OF THE INVENTION

1. Field of the Invention

The present invention relates to an optical position measuring device, in particular a so-called four-grating measuring system.

2. Description of the Related Art

As a rule, such position measuring devices include a light source, a transmitting graduation arranged in front thereof, a measuring graduation, a scanning graduation, as well as a detector arrangement with a periodic structure of individual detector elements, which constitutes a fourth graduation. Here, the light source, the transmitting graduation, the scanning graduation, as well as the detector arrangement are as a rule arranged in a scanning unit, which is movable in a defined measuring direction with respect to the measuring graduation. It is possible here to lay out such systems in the form of transmitted light systems, as well as incident light systems; it is also possible to create rotatory arrangements as well as linear arrangements. A corresponding measuring device is disclosed in WO 97/16704, for example. WO 97/16704 corresponds to U.S. Pat. No. 5,886,352, the entire contents of each of which are incorporated herein by reference. This document does not contain any further information regarding the dimensioning of the detector device.

Different variations of multi-grating transducers are also known from a publication by R. M. Pettigrew under the title "Analysis of Grating Imaging and its Application to Displacement Metrology" in SPIE, vol. 136, 1st European Congress on Optics Applied to Metrology (1977), pp. 325 to 332. The imaging conditions in connection with multi-grating transducers, wherein a divergent illumination is provided, are also discussed on page 328 of this publication. In this connection, divergent illumination should be understood to be one where no optical collimator device is arranged downstream of the light source used, i.e. the light beams emitted by the light source do not impinge exactly parallel on the first graduation in the beam path. Here, the discussion of the imaging conditions leads to the result that the enlargement factor in the beam path is determined by an arrangement, wherein the enlargement factor is determined from a centered elongation, starting in the measurement graduation plane. The enlargement factor is an important parameter in a system with divergent illumination, in that the optimal geometric dimensioning of the detector arrangement, or of the detector elements, is a deciding function of knowing the enlargement factor in the beam path.

However, in actual applications it has been shown that a beam path model as proposed in the mentioned publication leads to a four-grating system which has a poor degree of modulation of the generated scanning signals.

SUMMARY AND OBJECTS OF THE INVENTION

It is therefore an object of the present invention to disclose an optical position measuring device on the basis of a four-grating measuring system, wherein the problems discussed above are reduced as much as possible. In particular, a design of the detector arrangement in such a position measuring device, which is optimized in regard to the respective system prerequisites, is to be disclosed, which assures a sufficient degree of modulation of the position-dependent scanning signals.

This object is attained by an optical position measuring device that includes a measuring graduation and a scanning unit, which moves relative to the measuring graduation along a measuring direction. The scanning unit includes a light source, a transmitting graduation arranged distant from the light source at a distance $D_{LQ}$ and a scanning graduation with a graduation period $P_{AT}$, on which a periodic strip pattern with a strip pattern period $P_{SM}$ results in case of a relative movement between the scanning unit and the measuring graduation. A detector arrangement arranged at a distance $D_{DET}$ from the scanning graduation with a plurality of blocks of individual detector elements, wherein the plurality of blocks are arranged periodically with a detector period $P_{DET}$ in the measuring direction. The transmitting graduation is at the distance u from the measuring graduation, the scanning graduation is at a distance v from the measuring graduation, and the detector period $P_{DET}$ has been selected in accordance with the equation $P_{DET}=m*1*P_{v}$, wherein $m=(1+D_{DET}/(v+v+D_{LQ}))$ and $1=1, 2, 3, \ldots$ and $1/P_{v}=|1/P_{SM}=1/P_{AT}|$.

The measures in accordance with the present invention now assure that it is possible in connection with any arbitrary system configurations of an optical position measuring device based on the four-grating principle with divergent illumination to disclose an optimized design of the detector arrangement. A good degree of modulation of the position-dependent scanning signals in particular is assured by this.

Furthermore, the exact knowledge of the above mentioned enlargement factor also permits the dimensioning of the position measurement device in accordance with the present invention, which assures a defined tolerance regarding the scanning distance. Accordingly, a deviation of the actual scanning distance from an ideal scanning distance is also possible without the signal quality being decisively negatively affected.

As a further advantage of the four-grating system in accordance with the present invention is should be mentioned, that the detector arrangement here is not arranged directly adjoining the measuring graduation, which is movable with respect to the former. Instead, the scanning graduation, which protects the detector arrangement from possible damage by the measuring graduation, is arranged within the scanning unit in front of the detector arrangement.

The position measuring device in accordance with the present invention can of course be realized as an incident light, as well as a transmitted light system. In the same way it is possible to design linear, as well as rotatary arrangements in accordance with the invention.

Further advantages, as well as details, of the optical position measuring device in accordance with the present invention ensue from the following description of several exemplary embodiments by means of the attached drawings.

DESCRIPTION OF THE PREFERRED EMBODIMENT(S)

An embodiment of an optical position measuring device in accordance with the invention is represented in an extended view of FIG. 1, by which important geometric parameters will be explained in what follows. It should already be pointed out here that the representation in FIG. 1 is of course not to scale at all, but is simply intended to be used in a schematic form for explaining the various geometric parameters.

As already indicated above, the position measuring device in accordance with the present invention is embodied as a so-called four-grating measuring system and essentially includes a light source LQ, a transmitting graduation ST, a measuring graduation MT, a scanning graduation AT, as well as a periodically designed detector arrangement D. The fourth graduation, or the fourth grating, of the position measuring device is therefore embodied by the periodic detector arrangement D.

Figure 1:
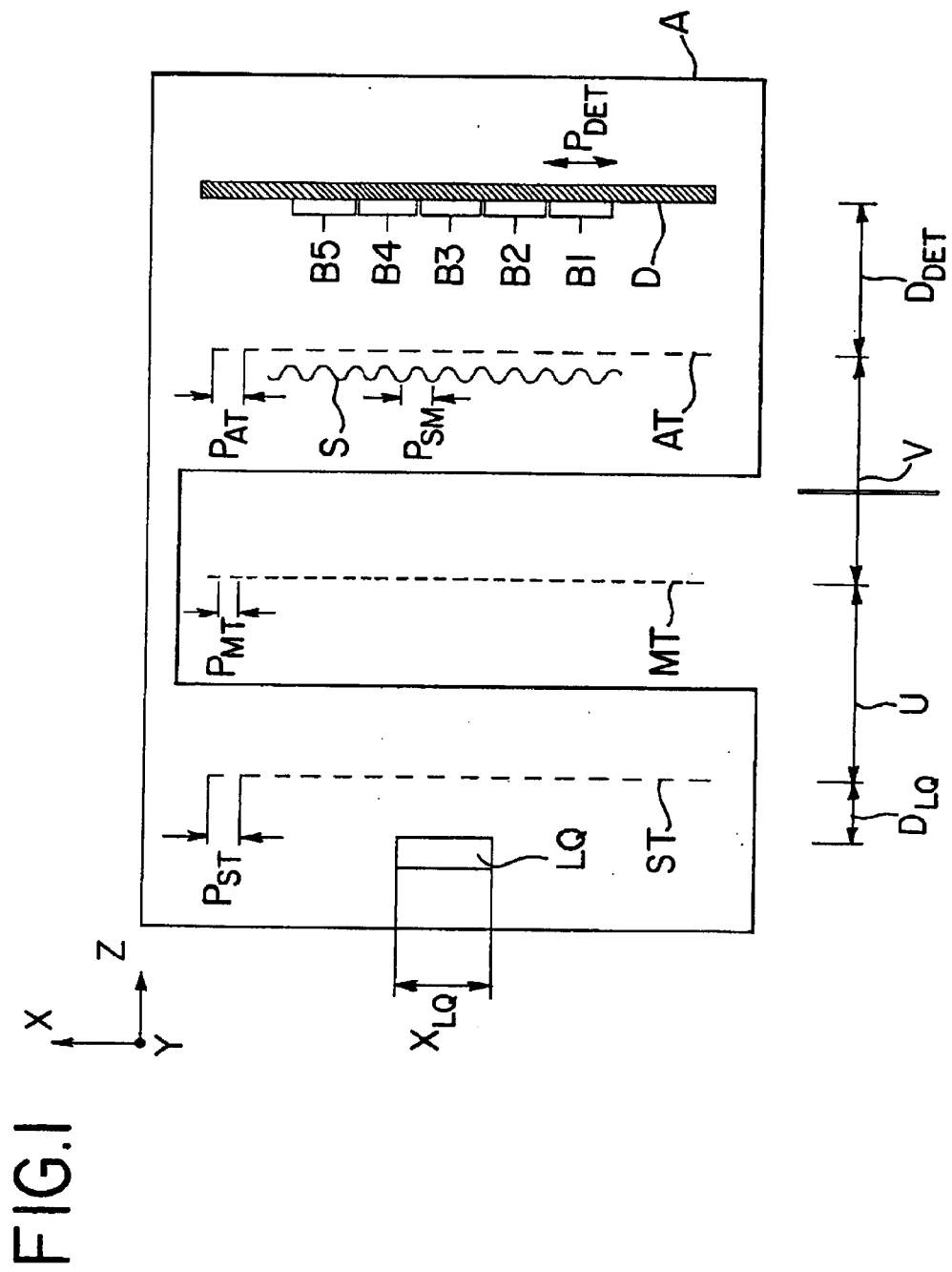
FIG. 1 is a schematic view of an embodiment of a position measuring device in accordance with the present invention in an extended representation.

As indicated in FIG. 1, the light source LQ, the transmitting graduation ST, the scanning graduation AT, as well as the detector arrangement D, are arranged in a common scanning unit A, which is movable in the measuring direction x with respect to the measuring graduation MT. The representation of the scanning unit A in FIG. 1 is not completely correct with respect to the selected measuring direction, but was only chosen in order to show which components are part of the scanning unit A.

It should be pointed out here that, besides the transmitted light variation represented in FIG. 1 for reasons of improved clarity, a correspondingly embodied incident light variation of the position measuring device of the present invention can also be produced. The essential difference of such a variation lies in that a reflecting measuring graduation MT is then required, while in FIG. 1 a transmitted light measuring graduation MT is employed. In the case of the incident light measuring graduation, the graduation MT and AT are furthermore preferably arranged together on a transparent support, or substrate.

The position measuring device of the present invention can be employed for an exact position determination in a numerically-controlled machine tool, for example. For this purpose, the scanning unit A and the measuring graduation MT are connected with components of the former which can be displaced with respect to each other. The position-dependent output signals are provided to a numeric machine tool control for further processing.

The detector arrangement D of the position measuring device includes a predetermined total M (M=1, 2, 3, 4, ...) of periodically arranged blocks B1 to BM, each with a predetermined number k (k=1, 2, 3, 4, ...) individual detector elements; in the example shown, M has been selected to equal 5 and k to equal 4. The detector period of the blocks B1 of detector elements will be identified by $P_{DET}$ in the course of the further description. The individual k detector elements of the blocks B1 to B5 have not been drawn in the schematic representation of FIG. 1. Reference is made to the following description of FIG. 2 in regard to the exact design of the detector arrangement D.

In accordance with FIG. 1, the predetermined distance between the light source LQ and the transmitting graduation ST is identified by $D_{LQ}$. In the measuring direction x, the light source LQ has a length $x_{LQ}$. The value u represents the predetermined distance between the transmitting graduation ST and the measuring graduation MT; the value v represents the predetermined distance between the measuring graduation MT and the scanning graduation AT. The predetermined distance between the scanning graduation AT and the detector arrangement D is represented by $D_{DET}$. The values $P_{ST}$, $P_{MT}$ and $P_{AT}$ respectively identify the graduation periods of the transmitting graduation ST, the measuring graduation MT and the scanning graduation AT, respectively. $P_{AT}$ is a predetermined graduation period.

In the case of a transmitted light system represented here, it is of course also possible to select the distance u between the transmitting graduation ST and the measuring graduation MT, and the distance v between the measuring graduation MT and the scanning graduation AT, to be unequal. But in an incident light system u=v applies as a rule for the distances of the measuring graduation MT to the respective adjoining graduations ST and AT.

The light beams emitted by the light source LQ pass through the various graduation ST and MT and provide a periodic strip pattern S of the strip pattern period $P_{SM}$ in the plane of the scanning graduation AT. In case of a relative movement between the scanning unit A and the measuring graduation MT, the strip pattern S undergoes a displacement-dependent modulation, which in the end is detected for the determination of the respective relative positions of the measuring graduation MT and the scanning graduation AT. A so-called Vernier scan of the strip pattern S is performed here with the aid of the periodically designed scanning graduation AT; reference is made in regard to this to the representation in FIG. 3. In this case the scanning graduation AT has a graduation period $P_{AT}$, which differs from the period $P_{SM}$ of the strip pattern S, as well as from the graduation periods $P_{ST}$, $P_{MT}$ of the transmitting and measuring graduations ST, MT, respectively. Light portions from the strip pattern S then pass through the adjoining transparent areas of the scanning graduation AT. The various light portions are then transformed by optoelectronic detector elements into electrical signal portions, or partial scanning signals TAS0–TAS270 with defined relative phase relations. For example, light portions of respectively 90° phase shifts can proceed in the direction of the detector arrangement D through adjoining transparent areas of the scanning graduation AT, as indicated in FIG. 3. Each one of the transparent areas of the scanning graduation AT is furthermore definitely assigned to one of the individual k detector elements in the detector arrangement D. Therefore, each detector element of the detector arrangement D detects one of the light portions and in this way generates one of the partial scanning signals TAS0 to TAS270 with a definite phase relation. The detector elements are suitably wired in the detector arrangement D, or in the scanning unit A in a way which will be explained in what follows by means of FIG. 2, so that it is possible in the end to transmit scanning signals S0 to S270 to a downstream-connected evaluation unit for further processing.

It has been recognized in accordance with the present invention that the periodicity of the detector arrangement, i.e. the detector period $P_{DET}$ is of decisive importance in connection with the generation of precise, position-dependent scanning signals. The optimum detector period $P_{DET}$ can be expressed in accordance with the present invention as a function of definite geometric parameters of the position measuring device by the following equation (1):

$$P_{DET}=m*I*P_V \qquad \text{Equ. (1)}$$

In this case, I=1, 2, 3, . . . applies to the parameter I.

In accordance with the following equation (2), the value m, hereinafter called an enlargement factor, is $$m=(1+D_{DET}/(u+v+D_{LQ})) \qquad \text{Equ. (2)}$$

If, as indicated above, u is selected to equal v, the equation (2') results:

$$m=(1+D_{DET}/(2*u+D_{LQ})) \qquad \text{Equ. (2')}$$

Let the value $P_V$ entered into the equation (1) be called a Vernier period in what follows. Reference is again made to FIG. 3 for a representative interpretation of the value $P_V$.

In accordance with the representation in FIG. 3, in the case where I=1, the Vernier period $P_V$ describes the periodicity in the plane of the scanning graduation AT, by which a multiple reproduction of the phase-shifted partial scanning signals. TAS0 to TAS270 in the measuring direction x is possible. In the example shown, $P_V$ graphically represents by I=1 that distance in the plane of the scanning graduation AT, by which four phase-shifted partial scanning signals TAS0 to TAS270 are obtained from four adjacent transparent areas. Accordingly, $P_V=4*P_{AT}$ applies in the example represented.

In general, the Vernier period $P_V$ in the scanning graduation AT as a function of the strip pattern period $P_{SM}$ results from the following equation (3):

$$1/P_V=|1/P_{SM}-1/P_{AT}| \qquad \text{(Equ.(3))}$$

If in the process k partial scanning signals are generated, which are phase-shifted by 360°/k, the Vernier period in accordance with equation (3') results in case of an exact association of the transparent areas of the scanning graduation with defined detector elements:

$$P_V=((k*p)+1)*P_{SM} \qquad \text{Equ. (3')}$$

In the case of the equation (3'), the graduation period of the scanning graduation was selected in accordance with equation (4):

$$P_{AT}=(1+I/(k*p)*P_{SM} \qquad \text{Equ. (4)}$$

Here, p=1, 2, 3, . . . applies in equations (3) and (4); moreover I must be selected to be aliquot to k, in that when I is divided into k a whole number results.

In these equations, the parameter k states the number of the detected different phase positions; the parameter I describes the number of the Vernier periods assigned to a detector period, while the parameter p specifies the number of scanning fields, or scanning gaps, which are assigned to a detector element.

If p>1 is selected here, it is possible to arrange several scanning gaps, or transparent areas within a scanning period PAT. Here, in an advantageous embodiment the distance $d_{AS}$ of adjoining scanning gaps is $d_{AS}=w*P_{SM}$, wherein w=0, 1, 2, . . . p−1. A design of this type respectively permits the assignment of several equiphase scanning gaps to one detector element.

Figure 6:
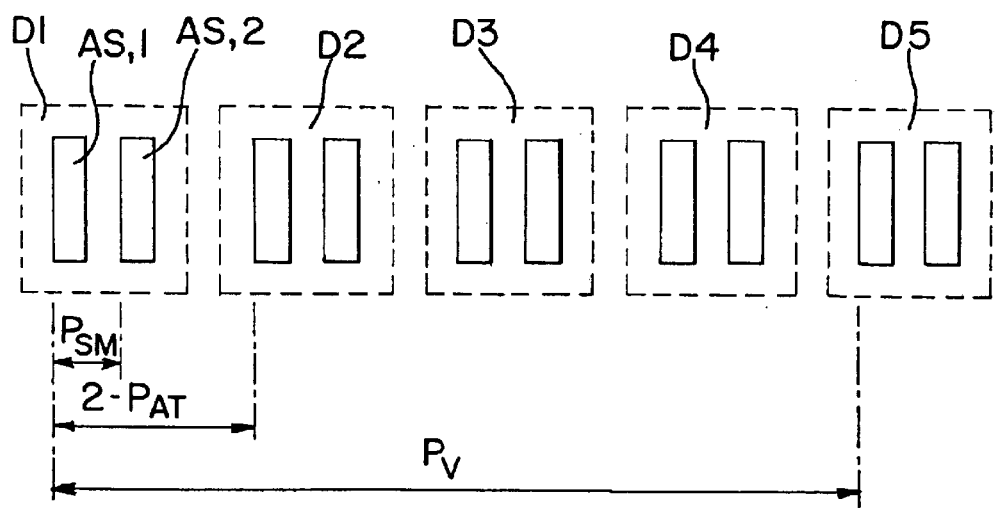

FIG. 6 shows a schematic view from above on a portion of the scanning plane, as well as the detector plane, of such an exemplary embodiment. Here, two scanning gaps AS are provided per detector element D. A corresponding quantitative exemplary embodiment will yet be explained in what follows in the course of the description.

For the derivation of the equation (2), i.e. the exact determination of the enlargement factor m, the present invention presupposes that the center of the central extension, which is the basis for the derivation, lies in the plane of the light source LQ. In contrast thereto, the above cited publication by R. M. Pettigrew suggested to start from a center located in the plane of the measuring graduation MT. However, this assumption provided detector periods $P_{DET}$ for the position measuring device, which would be too large for actual use. In turn, a degree of modulation of the scanning signals would result from this which would be too low, in particular in case of large scanning fields.

However, if the detector period $P_{DET}$ is selected in accordance with the above equations, it is possible to scan even large scanning fields at a high degree of modulation of the output signals. Large scanning fields in turn offer a clearly increased insensitivity to possible soiling.

Figure 2:
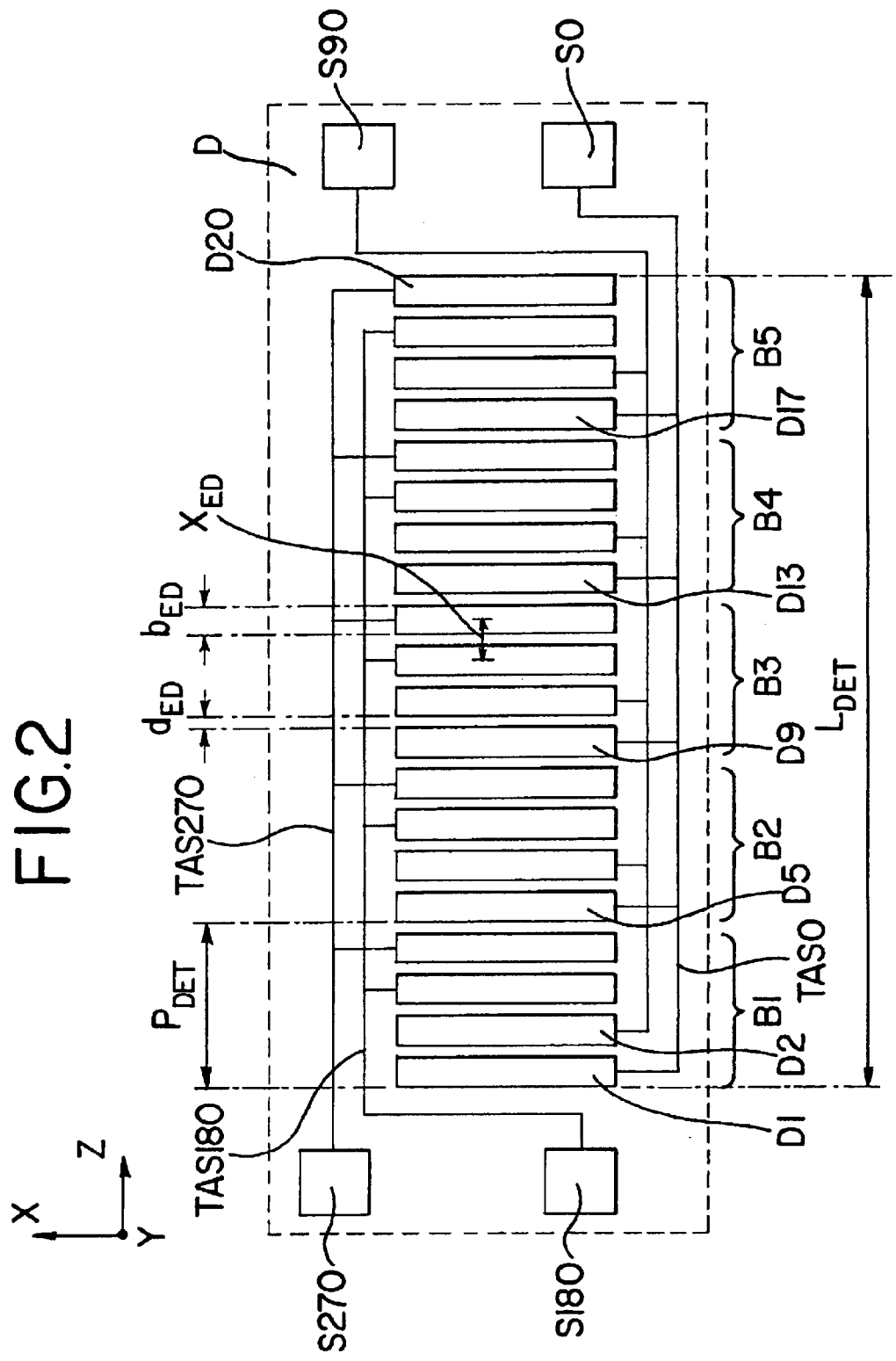
FIG. 2 is a top view of an exemplary embodiment of a suitable detector arrangement of a position measuring device in accordance with the present invention.
Figure 3:
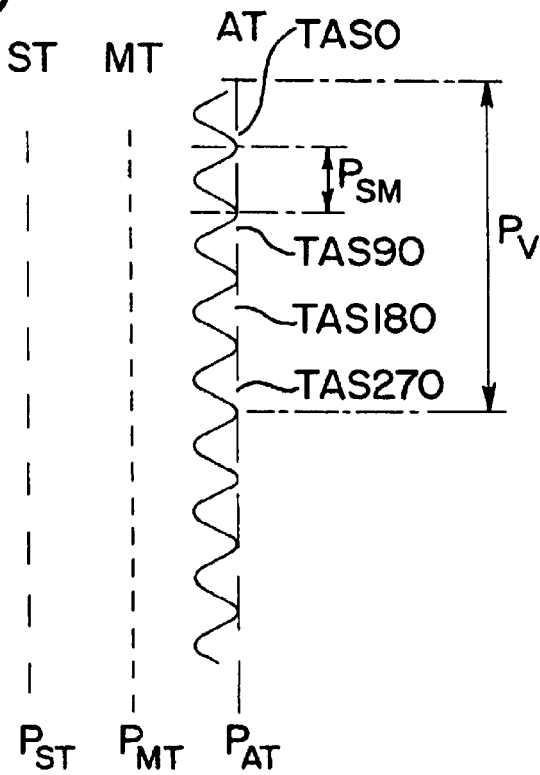
FIGS. 3 to 6 show further schematic representations of parts of an embodiment of a position measuring device in accordance with the present invention, by which respectively relevant parameters of the present invention are explained.

An advantageous embodiment of a suitable detector arrangement D is shown in FIG. 2 in a top view on the detector plane. The embodiment of the detector arrangement D represented is used for generating four output signals S0, S90, S180 and S270, which are modulated as a function of the displacement and which are respectively phase-shifted by 90° with respect to each other. Appropriately modified variations, which provide other phase relations between the outputs signals, can of course also be produced within the scope of the present invention.

A total of M=5 blocks B1 to B5, each with several individual detector elements D1 to D20, are periodically arranged in the measuring direction x in the example of FIG. 2. In this exemplary embodiment, respectively k=4 individual detector elements D1 to D20, which are all identically designed, are provided per block B1 to B5. The example includes a total n=20 separate detector elements D1 to D20. The detector elements D1 to D20 are each arranged at a distance $d_{ED}$ from each other, wherein the distance $d_{ED}$ between adjoining detector elements D1 to D20 has been selected to be identical over the entire detector arrangement D. Each detector element D1 to D20 has a narrow rectangular shape, wherein the longitudinal rectangular axis is oriented perpendicularly in the detector plane with respect to the measuring direction x, i.e. in the y-direction shown. A partial scanning system TAS0 to TAS270 of a defined phase position is generated per detector element in the course of scanning the periodic strip pattern S.

In accordance with the present invention, the detection period $P_{DET}$ was selected in accordance with the previously discussed equations (1) and (2) and accordingly shows the length of a block B1 to B5 with four detector elements D1 to D20, as shown in FIG. 2. As a result, in the case of the arrangement shown of M=5 blocks B1 to B5, the length $L_{DET}$ of the detector arrangement D is $L_{DET}=M*P_{DET}=5*P_{DET}-d_{ed}$.

As can also be seen in FIG. 2, in the embodiment represented, each kth, i.e. each fourth detector element D1 to D20, is electrically connected, i.e. the first detector element D1 from the left is connected with the fifth detector element D5 from the left, with the ninth, with the thirteenth, as well as with the seventeenth detector element D9, D13, D17. The other detector elements are connected with each other analogously to this. Thus, a total of k=4 groups of detector elements D1 to D20, respectively connected in pairs, exists which, in the case of the arrangement shown, provide output signals S0, S90, S180, S270, each phase-shifted by 90°. The output signals S0, S90, S180, S270 can be picked up at the indicated contact pads of the detector arrangement D. Accordingly, each group of detector elements wired in this way provides output signals with a defined phase relation, wherein the phase positions of the k=4 different groups each differ by 90° in this embodiment variation.

It is possible in an alternative embodiment to select k=3, from which a phase shift of 120° between the output signals would result. In principle, a phase shift of 360°/k between the output signals of the k different groups of wired together detector elements therefore results as a function of the parameter k.

In the general case, respectively k individual detector elements are arranged per block at equidistant spacings $d_{ED}$. The distance between the center positions of adjacent detector elements is $x_{ED}=d_{ED}+b_{ED}$. In accordance with FIG. 2, the distances, or the widths, of the individual detector elements are designated as $d_{ED}$, or $b_{ED}$.

The distances between the adjacent detector elements of a group, i.e. the distances between the first and the fifth detector elements D1, D5, between the fifth and the ninth detector elements D5, D9, etc., each are a whole number multiple of the detector period $P_{DET}$. In the example represented in FIG. 2, this distance is respectively a single detector period $P_{DET}$.

The width $b_{ED}$ of a single detector element D1 to D20, i.e. the width of a rectangular detector element D1 to D20 in the measuring direction x, also is a further important parameter of the advantageous design of the detector arrangement D. Of particular importance here is the requirement that cross talk between adjacent phase-shifted detector elements should be avoided as much as possible. This means in the end that the defined assignment of the phase position of a signal portion from a transparent area of the scanning graduation to a defined detector element is always assured.

In the case of k=4 detector elements per block B1 to B5, and a detector period $P_{DET}$, the normal width $b_{ED}$ of a single detector element would therefore be $P_{DET}/4$. Although in this case each individual detector element D1 to D20 would register a maximum signal intensity, with a width of this type selected, the above mentioned requirement for the least possible cross talk between adjacent detector elements cannot always be met under certain circumstances, i.e. under certain prevailing geometric peripheral conditions.

It has now been further established within the scope of the present invention how to determine the optimized width $b_{ED,n}$ of the individual nth detector element D1 to D20 as a function of various system parameters of such a position measuring device. The equation (5) shown in what follows provides a detector element width $b_{ED,n}$ for the nth detector element, which represents a good compromise between the requirement for the least possible cross talk between adjacent detector elements D1 to D20, and the highest possible signal intensity which is registered by each detector element D1 to D20. Moreover, it is possible to determine a minimum width for each individual one of the total of n detector elements in the detector arrangement in order to make available a sufficient light intensity, while simultaneously avoiding cross talk:

$$b_{DE,n} \geq (\tan \alpha_{max} - \tan \alpha_{min}) * D_{DET} \quad \text{Equ. (5)}$$

Figure 4:
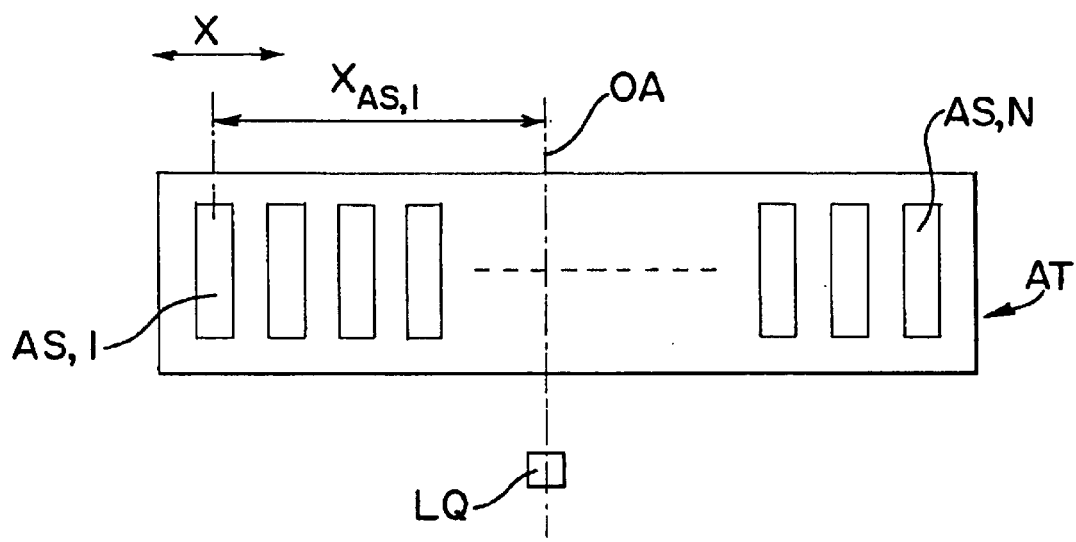

The following applies here:

$$\alpha_{min}=[(\arctan(x_{AS,N}+P_{SM}/1-xLQ/2))/(2*u+DLQ)]-\arcsin(q*\lambda/P_{MT}) \quad \text{Equ. (5.1)}$$

and $$\alpha_{max}=[(\arctan(x_{AS,N}+P_{SM}/2+xLQ/2))(2*u+DLQ)]+\arcsin(q*\lambda/P_{MT}) \quad \text{Equ. (5.2)}$$

wherein $x_{AS,N}$: is the distance of the Nth scanning gap AS from the optical axis OA in accordance with the definition in FIG. 4, $x_{LQ}$: extension of the light source in the measuring direction x, $\mu$: the distance between the transmitting graduation and the measuring graduation, or between the measuring graduation and the scanning graduation, $D_{LQ}$: the distance between the light source and the transmitting graduation, $\lambda$: the wavelength of the light source used, q: the order of diffraction at the measuring graduation which primarily contributes to signal yield (0, 1, 2, . . . ); in actual use, the 0th and +/−1st orders of diffraction essentially contribute to the signal yield, $P_{MT}$: graduation period of the measuring graduation.

It should furthermore be noted that the case where u=v is described in the equations (5), (5.1) and (5.2), i.e. an incident light system. These equations can of course also be modified without problems for the case where n≠v.

Figure 5:
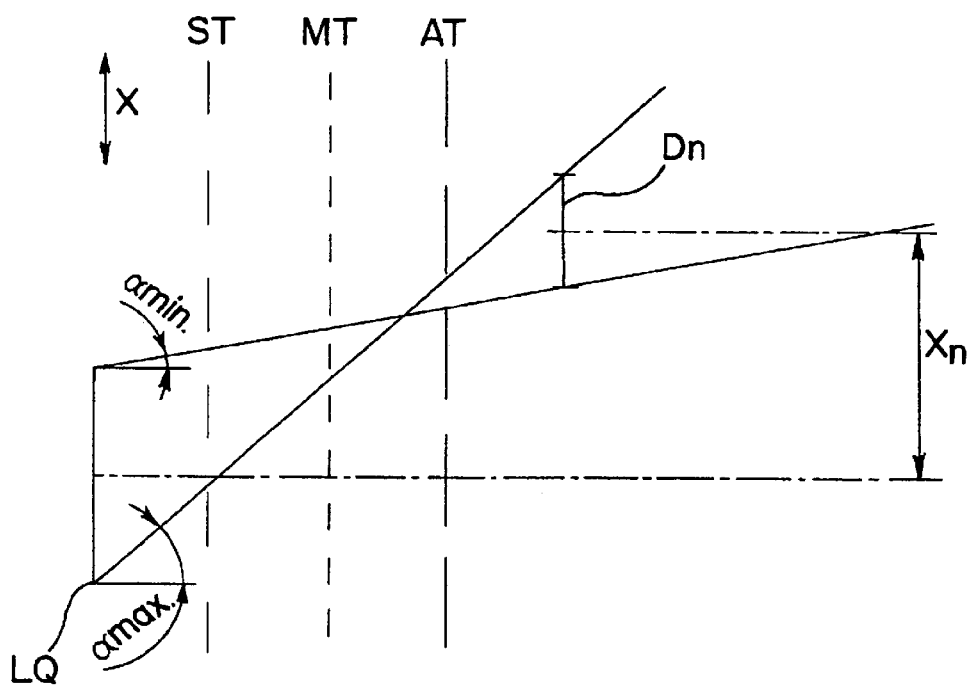

The angles $\alpha_{min}$ and $\alpha_{max}$ inserted into the equation (5) can also be interpreted graphically. Reference is made to FIG. 5 in this connection. The angle of the transmitting graduation ST above the normal line, to which beams are assigned which, originating at the edge of an extensive light source LQ, still pass through a common transparent area of the scanning graduation AT and impinge on the same detector element, is described by means of $\alpha_{min}$ and $\alpha_{max}$.

In conclusion, two concrete exemplary embodiments of position measuring devices will be shown, wherein the parameters $P_{DET}$ and $b_{ED}$ were determined in the detector arrangement on the basis of the above explained consideration in accordance with the present invention. The discussed variations primarily differ by the respectively selected light source.

The following parameters are provided for the first exemplary embodiment with an almost point-like light source:

| | |
|---|---|
| $x_{LQ}$ | 0.1 mm |
| $D_{LQ}$ | 0.2 mm |
| $D_{DET}$ | 0.2 mm |
| u = v | 0.8 mm |
| $P_{MT}$ | 20 μm |
| $P_{ST}$ | 40 μm |
| $P_{AT}$ | 50 μm |
| $P_{SM}$ | 40 μm |
| $P_V$ | 200 μm |

For the scanning graduation, the width of the transparent areas was selected to be 20 μm, and the width of the opaque area to be 30 μm.

The detector period $P_{DET}$ results from these values with the aid of the two equations (1) and (2) as:

$$P_{DET}=232 \; \mu m$$

With the further parameters:

| | |
|---|---|
| $x_n$ | 0 (detector element on the optical axis) |
| $d_{ED}$ | 13 μm |
| q | 0 |
| λ | 860 nm | the value $b_{ED,0}$ results for the optimum width $b_{ED,n}$ of a single detector element arranged directly adjacent to the optical axis by means of the equations (5), (5.1), (5.2) as:

$$b_{ED,0}=45 \; \mu m.$$

This value represents the optimized detector width when taking q=0, as well as +/−1st order of diffraction, into consideration in the course of obtaining the signal. In actual use, the appearance of cross talk because of the participation of further orders of diffraction is tolerated, because it is possible in this way to achieve the filtering of harmonic waves in the generated scanning signals. This can be negligible cross talk of the +/=2nd orders of diffraction.

In the second quantitative exemplary embodiment of the invention, an extended light source LQ is employed, i.e. the value $x_{LQ}$ has been selected to be clearly greater than in the previous example. The following are preselected parameters of the system:

| | |
|---|---|
| $x_{LQ}$ | 0.35 mm |
| $D_{LQ}$ | 0.3 mm |
| $D_{DET}$ | 0.35 mm |
| u = v | 0.8 mm |
| $P_{MT}$ | 20 μm |
| $P_{ST}$ | 40 μm |
| $P_{AT}$ | 45 μm |
| $P_{SM}$ | 40 μm |
| $P_V$ | 360 μm |

Here, the scanning graduation was dimensioned in such a way that two transparent areas, or scanning gaps, of a respective width of 20 μm were provided within two scanning periods, i.e. within $2*P_{AT}=90 \; \mu m$. FIG. 6 shows a view from above on a portion of the scanning graduation AT, as well as an associated section of the detector plane with the detector elements D1 to D5 of this example.

With the aid of the two equations (1) and (2), the detector period $P_{DET}$ results from these values as:

$$P_{DET}=417 \; \mu m.$$

With such a design of the scanning graduation, a detector element D1 to D5, again with the optimized width $b_{ED,n}$, is assigned on the detector arrangement to the two transparent areas AS,1, AS,2 . . . per $n*P_{AT}$ scanning periods on the scanning graduation. For example, the detector element D1 is assigned on the two scanning gaps AS,1 and AS,2, etc. To assure a good degree of modulation, the distance of the two scanning gaps AS,1 and AS,2, by means of which equiphase signals are detected, is selected to equal $P_{SM}$.

The optimized widths $b_{ED,n}$ of the individual n detector elements D1 to D5 can again be determined as in the previous example with the aid of the equations (5), (5.1) and (5.2).

With the further parameters required for this,

| | |
|---|---|
| $x_n$ | 0 (detector element on the optical axis) |
| $d_{ED}$ | 13.5 μm |
| q | 0 |
| λ | 860 nm | the sought after value $b_{ED,0}$ results by means of the equations (5), (5.1) and (5.2) as $$b_{ED,0}=91 \; \mu m.$$

As the equations (5), (5.1) and (5.2) show, the extended light source has the effect that a larger Vernier period $P_v$ must basically be provided in order to dependably avoid the mentioned cross talk. The graduation period $P_{AT}$ of the scanning graduation was also selected to be correspondingly different in this exemplary embodiment.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. An optical position measuring device, comprising:
    a measuring graduation;
    a scanning unit, which moves relative to said measuring graduation along a measuring direction, said scanning unit comprising:
        a light source;
        a transmitting graduation arranged distant from said light source at a predetermined distance $D_{LQ}$;
        a scanning graduation with a predetermined graduation period $P_{AT}$, on which a periodic strip pattern with a strip pattern period $P_{SM}$ results in case of a relative movement between said scanning unit and said measuring graduation;
        a detector arrangement arranged at a predetermined distance $D_{DET}$ from said scanning graduation with a plurality of blocks of individual detector elements, wherein said plurality of blocks are arranged periodically with a detector period $P_{DET}$ in said measuring direction; and
    wherein said transmitting graduation is at a predetermined distance u from said measuring graduation, said scanning graduation is at a predetermined distance v from said measuring graduation, and said detector period $P_{DET}$ has been selected in accordance with the equation $$P_{DET}=m*I*P_v,$$

wherein $$m=(1+D_{DET}/(u+v+D_{LQ}))$$

and $$I=1, 2, 3, \ldots$$

and $$1/P_v=|1/P_{SM}-1/P_{AT}|.$$

2. The optical position measuring device in accordance with claim 1, wherein in the case of a predetermined number k partial scanning signals phase-shifted by 360°/k, $P_v=((k*p)I+1)*P_{SM}$, wherein $k=1, 2, 3, 4, \ldots$ $P_{AT}=(1+I)(k*p)*P_{SM}$ and $p=1, 2, 3, \ldots$, and I must be selected to be aliquot to k.

3. The optical position measuring device in accordance with claim 1, wherein said detector arrangement comprises a predetermined number M blocks, each with a predetermined number k individual detector elements, and distances $x_{ED}$ of center positions of adjoining detector elements are selected in accordance with $x_{ED}=P_{DET}/k$, wherein $k=1, 2, 3, 4 \ldots$ and $M=1, 2, 3, 4, \ldots$.

4. The optical position measuring device in accordance with claim 3, wherein k=4 individual detector elements are arranged per block at such a distance from each other that adjacent detector elements provide partial scanning signals, which are phase-shifted by 90° with respect to one another.

5. The optical position measuring device in accordance with claim 1, wherein each kth one of said individual detector elements of said detector arrangement is connected with the other, so that a predetermined number k partial scanning signals with a phase shift of 360°/k are present at said detector arrangement, wherein $k=1, 2, 3, 4 \ldots$.

6. The optical position measuring device in accordance with claim 1, wherein each one of said individual detector elements has a width of $b_{ED,n}(\tan \alpha_{max}-\tan \alpha_{min})*D_{DET}$, wherein:

$\alpha_{min}=[(\arctan(x_{AS.N}+P_{SM}/2-x_{LQ}/2))/(2*\mu+D_{LQ})]-\arcsin(q*\lambda/P_{MT})$ $\alpha_{max}=[(\arctan(x_{AS.N}+P_{SM}/2+x_{LQ}/2))/(2*\mu+D_{LQ})]+\arcsin(q*\lambda/P_{MT})$, wherein:

$x_{AS.N}$: is a distance of an Nth scanning gap AS from an optical axis, $x_{LQ}$: an extension of said light source in said measuring direction, $\mu$: a distance between said transmitting graduation and said measuring graduation, or between said measuring graduation and said scanning graduation, $D_{LQ}$: a distance between said light source and said transmitting graduation, $\lambda$: a wavelength of said light source used, q: an order of diffraction at said measuring graduation which primarily contributes to signal yield (0, 1, 2, . . . ); in actual use; the 0th and +/− 1st orders of diffraction essentially contribute to a signal yield, $P_{MT}$: graduation period of said measuring graduation.

7. The optical position measuring device in accordance with claim 1, wherein several transparent areas of said scanning graduation are assigned to a detector element of said detector arrangement.

* * * * *

UNITED STATES PATENT AND TRADEMARK OFFICE
CERTIFICATE OF CORRECTION

PATENT NO. : 6,794,637 B1
APPLICATION NO. : 09/937757
DATED : September 21, 2004
INVENTOR(S) : Wolfgang Holzapfel et al.

It is certified that error appears in the above-identified patent and that said Letters Patent is hereby corrected as shown below:

<u>In the Claims</u>

Column 12, claim 6, line 3, delete "$b_{ED.n}$" and substitute --$b_{ED.n.}$-- in its place.

Column 12, in claim 6, lines 8, 10 and 18, delete "$\mu$" and substitute --u-- in its place.

Signed and Sealed this

Twenty-second Day of August, 2006

JON W. DUDAS
*Director of the United States Patent and Trademark Office*